US011131579B2

(12) United States Patent
Sun et al.

(10) Patent No.: US 11,131,579 B2
(45) Date of Patent: Sep. 28, 2021

(54) PIEZOELECTRIC PATCH-BASED REAL-TIME AND HIGH-PRECISION BOLT PRELOAD DETECTION METHOD AND SYSTEM

(71) Applicant: DALIAN UNIVERSITY OF TECHNOLOGY, Dalian (CN)

(72) Inventors: Qingchao Sun, Dalian (CN); Bo Yuan, Dalian (CN); Wei Sun, Dalian (CN); Jiecheng Ding, Dalian (CN)

(73) Assignee: DALIAN UNIVERSITY OF TECHNOLOGY, Dalian (CN)

( * ) Notice: Subject to any disclaimer, the term of this patent is extended or adjusted under 35 U.S.C. 154(b) by 226 days.

(21) Appl. No.: 16/606,991

(22) PCT Filed: Feb. 7, 2018

(86) PCT No.: PCT/CN2018/075602
§ 371 (c)(1),
(2) Date: Oct. 21, 2019

(87) PCT Pub. No.: WO2019/153138
PCT Pub. Date: Aug. 15, 2019

(65) Prior Publication Data
US 2020/0278240 A1    Sep. 3, 2020

(51) Int. Cl.
*G01H 1/08* (2006.01)
*G01H 11/08* (2006.01)
*G01L 5/24* (2006.01)

(52) U.S. Cl.
CPC .............. *G01H 11/08* (2013.01); *G01L 5/246* (2013.01)

(58) Field of Classification Search
CPC .................................. G01H 11/08; G01L 5/246
See application file for complete search history.

(56) References Cited

U.S. PATENT DOCUMENTS

| 4,602,511 A * | 7/1986 | Holt | G01N 29/07 |
| | | | 73/581 |
| 9,063,069 B2 * | 6/2015 | Stickel | G01L 5/246 |

(Continued)

FOREIGN PATENT DOCUMENTS

| CN | 2226289 Y | 5/1996 |
| CN | 102564680 A | 7/2012 |

(Continued)

*Primary Examiner* — Jamel E Williams
(74) *Attorney, Agent, or Firm* — Muncy, Geissler, Olds & Lowe, P.C.

(57) ABSTRACT

The present invention discloses a piezoelectric patch-based real-time and high-precision bolt preload detection method and system. A piezoelectric patch is used as an ultrasonic excitation source and pasted on the head of a bolt, and the high-precision fitting relationship between the ultrasonic change of time-of-flight and the bolt preload is established according to the law of the ultrasonic change of time-of-flight of single echo with the stress so that the real-time detection of the bolt preload is realized by using the mathematical relationship. Compared with the previous method using ultrasonic probes, the present invention eliminates the error caused by the uncertainty of couplant thickness and further improves the measurement precision by using the change of time-of-flight of single echo. Meanwhile, the low-error rate measurement of the bolt preload is realized at a low cost and without affecting the structural performance.

2 Claims, 2 Drawing Sheets

(56) References Cited

U.S. PATENT DOCUMENTS

2020/0041369 A1* 2/2020 Sakakibara ............. G01L 5/246
2020/0141826 A1* 5/2020 Klein ...................... G01L 5/246

FOREIGN PATENT DOCUMENTS

| CN | 105115652 A | 12/2015 |
| CN | 105784249 A | 7/2016 |
| CN | 106679859 A | 5/2017 |
| CN | 206177497 U | 5/2017 |

* cited by examiner

PIEZOELECTRIC PATCH-BASED REAL-TIME AND HIGH-PRECISION BOLT PRELOAD DETECTION METHOD AND SYSTEM

TECHNICAL FIELD

The present invention belongs to the technical field of preload detection, and particularly relates to a piezoelectric patch-based real-time and high-precision bolt preload detection method and system.

BACKGROUND

As common connecting pieces, bolts are widely used in engineering. The axial preload exerted on the bolts has a big impact on the performance and life thereof. If the preload is too small, the connection will be unreliable, and phenomena such as vibration, looseness, leakage and structural slippage will occur during operation, thereby affecting the normal operation of the machine; and if the preload is too large, the structural size of a bolt will be increased, which causes the bolt to be prone to fracture under load, thereby weakening the bearing capacity of the node and even inducing structural instability in severe case. The internal stress measurement of the bolt can prevent accidents, ensure that the bolt is evenly stressed, and optimize the design of the bolt in terms of geometric size and quality. Therefore, the research on scientific and accurate measurement of the preload magnitude has been paid more and more attention.

At present, the bolt preload detection methods mainly include torque wrench method, fixed strain gage method, pressure sensor method and ultrasonic detection method. The torque wrench method is simple and easy to use, but causes the measurement error to be generally more than 40% due to the dispersibility of thread friction and end surface friction; the fixed strain gage method is to conduct measurement by pasting a strain gage on the side wall of the bolt, but the measured value is only the stress of the side wall of the bolt, and the method is greatly limited in the assembly; the pressure sensor method has high measurement precision, but destroys the wholeness and integrity of workpieces and sometimes causes the installation to be impossible due to the limit of geometric space.

Ultrasonic detection method is a new method, and the current existing detection methods are basically to conduct detection by an ultrasonic probe. Since couplant must be applied in the use of the ultrasonic probe, the thickness of the couplant is uncontrollable, and the repeatability of the ultrasonic probe is poor, the probability of error caused thereby is basically about 10%, and the purchase cost of the ultrasonic probe is also high. Directly pasting the piezoelectric patch on the head of the bolt eliminates the application of the couplant and the error caused thereby (ensuring high repeatability). The characteristic of single echo measurement is used for further improving the measurement precision so as to control the probability of error to be about 1%, and meanwhile, the preload detection cost is also reduced greatly. Therefore, a more precise and convenient test mode is provided for in-place bolt detection.

SUMMARY

In view of the defects of the existing preload detection methods, and in order to overcome the error caused by an ultrasonic probe and the high cost, the present invention provides a piezoelectric patch-based real-time and high-precision bolt preload detection method and system. In the present invention, a piezoelectric patch is pasted on the head of the bolt to substitute an ultrasonic probe, thus greatly improving the repeatability of measurement; and the change of time-of-flight of a first echo is used to characterize the variation of preload, thus avoiding the low-resolution error of the time difference of double echoes. The low-resolution measurement of the variation of double echoes is substituted by the high-resolution measurement of the variation of single echo, thus further improving the measurement precision.

The technical solution of the present invention is:

A piezoelectric patch-based real-time and high-precision bolt preload detection system, comprising a PC terminal 1, an FPGA module 2, an acquisition module 3, an amplifier 4, a K-type thermocouple temperature sensor 5, an ultrasonic pulser/receiver 6, an oscilloscope 7, a piezoelectric patch 8, an upper junction plate 9, a pressure sensor 10, a bolt 11 pasted with the patch, and a lower junction plate 12, wherein the pressure sensor 10 is arranged between the upper junction plate 9 and the lower junction plate 12, the bolt is inserted into the upper junction plate 9, the pressure sensor 10 and the lower junction plate 12 in sequence, and the center of the head of the bolt is pasted with the piezoelectric patch 8; the piezoelectric patch 8 is connected with the ultrasonic pulser/receiver 6, the ultrasonic pulser/receiver 6 is connected with the oscilloscope 7, and the oscilloscope 7 transmits data to the PC terminal 1; and the K-type thermocouple temperature sensor 5 is arranged on the pressure sensor 10, output signals of the K-type thermocouple temperature sensor 5 and the pressure sensor 10 are amplified by the amplifier 4 and acquired by the acquisition module 3, the signals acquired by the acquisition module 3 are transmitted to the FPGA module 2, and the FPGA module 2 transmits the acquired signals to the PC terminal 1 through serial communication.

A piezoelectric patch-based real-time and high-precision bolt preload detection method, comprising the following steps:

(1) Establishing a preload test model based on the change of time-of-flight of single echo:

Characterizing the service condition of preload by detecting the change of time-of-flight, i.e. the time difference between a first echo of a first reflection echo and a first echo of a second reflection echo, and theoretically deriving the relation model thereof as follows:

$$F = \frac{V_0}{2(A_L + E^{-1})} \cdot \frac{S_e(1 + \alpha_t \Delta T)}{L_e(1 + \beta \Delta T)} \cdot \Delta t$$

where, F is preload, $V_0$ is initial ultrasonic velocity, $A_L$ is ultrasonic stress coefficient, E is the elastic modulus of material, $S_e$ is the cross-sectional area of the bolt, $L_e$ is the effective tightening length of the bolt, $\alpha_t$ is the temperature-varying coefficient of longitudinal wave velocity, $\beta$ is the expansion coefficient of material, $\Delta T$ is variation of temperature, and $\Delta t$ is the change of time-of-flight of single echo;

It is seen from the above formula that the preload magnitude has an approximately linear relationship with the change of time-of-flight and the preload is detected by means of line fitting, i.e. without measuring properties of the material;

(2) Fitting the relationship between the change of time-of-flight of single echo and the bolt preload;

1) Ensuring that in the process of establishing the relationship, the temperature does not change, and the value of the pressure sensor is zero before operation;

2) Pasting the corresponding piezoelectric patch 8 on the center of the head of the bolt as the pulser and the receiver;

3) Connecting the piezoelectric patch 8 with the ultrasonic pulser/receiver 6, and using the single-transmitting and single-receiving function to simultaneously transmit and receive ultrasonic signals; and then connecting the ultrasonic pulser/receiver 6 with the oscilloscope 7 which transmits data to the PC terminal 1;

4) Placing the K-type thermocouple temperature sensor 5 with a magnetic probe on the pressure sensor 10. The output signals of the K-type thermocouple temperature sensor 5 and the pressure sensor 10 are amplified by the amplifier 4 and acquired by the acquisition module 3, the signals acquired by the acquisition module 3 are transmitted to the FPGA module 2, and the FPGA module 2 transmits the acquired signals to the PC terminal 1 through serial communication;

5) Exerting a certain preload on the bolt to change the pressure signals of the pressure sensor 10;

6) Under the condition of ensuring that the temperature is constant, acquiring the ultrasonic signals, conducting high-pass and low-pass filtering processing on the ultrasonic signals, calculating the ultrasonic phase and the phase difference from the initial state at this moment, and taking the ultrasonic phase and preload magnitude which are recorded at this moment as a group of corresponding values;

7) Continuously increasing the preload magnitude from the looseness state of the bolt. Each preload value corresponds to an ultrasonic phase value. Repeating 5) and 6) until the preload magnitude is increased to the rated preload range of the bolt;

8) Establishing an array of the acquired ultrasonic phase difference and the preload, and obtaining the fitting relationship between the ultrasonic phase difference T and the preload F by means of line fitting; and then adding the ultrasonic temperature coefficient of the corresponding material, thus obtaining the mathematical expression F=f(T, t) between the preload F and the ultrasonic phase difference T and temperature t;

(3) Conducting real-time detection on the bolt preload by using the mathematical relationship expression;

1) Acquiring and calculating the ultrasonic phase in the initial state, i.e. the no-preload state, and acquiring the temperature value and the pressure value in the initial state;

2) Exerting the preload, reacquiring the ultrasonic phase at this moment, and calculating the corresponding ultrasonic phase difference;

3) Substituting the acquired temperature value and the calculated ultrasonic phase difference into the obtained mathematical relationship expression F=f(T,t) between the preload and the ultrasonic phase difference and temperature to calculate the predicted preload magnitude.

The present invention has the following beneficial effect that: compared with the previous method using ultrasonic probes, the present invention eliminates the error caused by the uncertainty of couplant thickness and further improves the measurement precision by using the change of time-of-flight of single echo. Meanwhile, the low-error rate measurement of the bolt preload is realized at a low cost and without affecting the structural performance.

Figure 1:
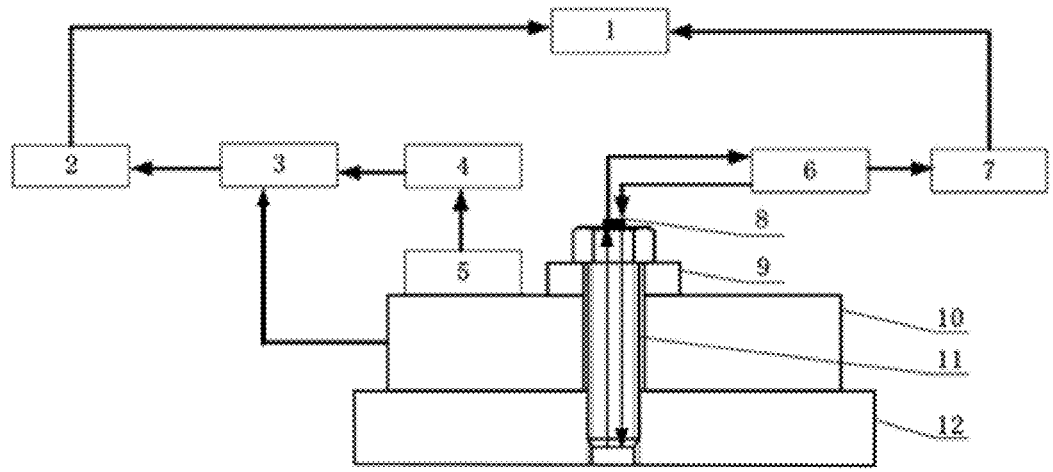
FIG. 1 is a diagram of a bolt preload detection system of the present invention.

In the figures: 1 PC terminal; 2 FPGA module; 3 acquisition module; 4 amplifier;

5 K-type thermocouple temperature sensor; 6 ultrasonic pulser/receiver; 7 oscilloscope; 8 piezoelectric patch;

9 upper junction plate; 10 pressure sensor; 11 bolt pasted with patch; 12 lower junction plate.

DETAILED DESCRIPTION

Specific embodiment of the present invention is further described below in combination with accompanying drawings and the technical solution.

A piezoelectric patch-based real-time and high-precision bolt preload detection method, comprising the following steps:

1. Preload test model based on the change of time-of-flight of single echo

Characterizing the service condition of preload by detecting the change of time-of-flight (the time difference between the first echo of the first reflection echo and the first echo of the second reflection echo).

In the case of plane waves of homogeneous and isotropic materials, the velocities of the longitudinal waves and the directions of the applied stresses are the same, which can be expressed by the first-order approximation thereof as follows:

$$V_L = V_0(1 + A_L \sigma)$$

where, $V_L$ is the propagation velocity of a longitudinal wave in the stress state, $V_0$ is the propagation velocity of a longitudinal wave in the unstressed state, $A_L$ is an ultrasonic stress coefficient, and $\sigma$ is the stress magnitude of the bolt.

The total length of a bolt under preload is composed of a stressed part and an unstressed part. In view of the fact, assuming that the initial length of the bolt is the sum of clamping length and unstressed length, i.e. the following relationship:

$$L = L_0 + L_e$$

where, L is the total length of the bolt under no preload, $L_0$ is the unstressed length under no preload, and $L_e$ is the clamping length under no preload.

Assuming Le is subjected to homogeneous uniaxial stress $\sigma$, the following relationship is obtained:

$$t = \frac{2L_\sigma}{V} + \frac{2L_0}{V_0} = \frac{2L_e(1 + E^{-1}\sigma)}{V_0(1 + A_L\sigma)} + \frac{2L_0}{V_0}$$

where, E is the elastic modulus of material, $L_\sigma$ is the clamping length under preload, and t is the ultrasonic flight time.

Conducting first-order expansion on the relationship, and subtracting the initial state, thus obtaining $$\Delta t = t(\sigma) - t(\sigma_0) = \frac{2L_e(A_L + E^{-1})}{V_0} \sigma = \frac{2L_e(A_L + E^{-1})}{V_0} \cdot \frac{F}{S_e}$$

$$= \frac{2(A_L + E^{-1})}{V_0} \cdot \frac{L_e}{S_e} \cdot F$$

Considering the fact that the temperature has effect on the elongation of the bolt and the ultrasonic velocity, the following relationship is obtained:

$$\Delta t = \frac{2(A_L + E^{-1})}{V_0(1 + \alpha_t \Delta T)} \cdot \frac{L_e(1 + \beta \Delta T)}{S_e} \cdot F$$

where, $\alpha_t$ is the temperature-varying coefficient of longitudinal wave velocity, whose value is only related to the properties of the material, $\beta$ is the temperature expansion coefficient of the bolt, $S_e$ is the effective sectional area, and F is the applied preload.

According to the above content, the relationship can be transformed as follows:

$$F = \frac{V_0}{2(A_L + E^{-1})} \cdot \frac{S_e(1 + \alpha_t \Delta T)}{L_e(1 + \beta \Delta T)} \cdot \Delta t$$

It can be seen from the above formula that the preload magnitude has an approximately linear relationship with the change of time-of-flight and the preload can be easily detected by means of line fitting, i.e. without measuring properties of the material.

2. Structure and operating principle of preload measurement system

The present invention is further described below in combination with the drawings.

Figure 2:
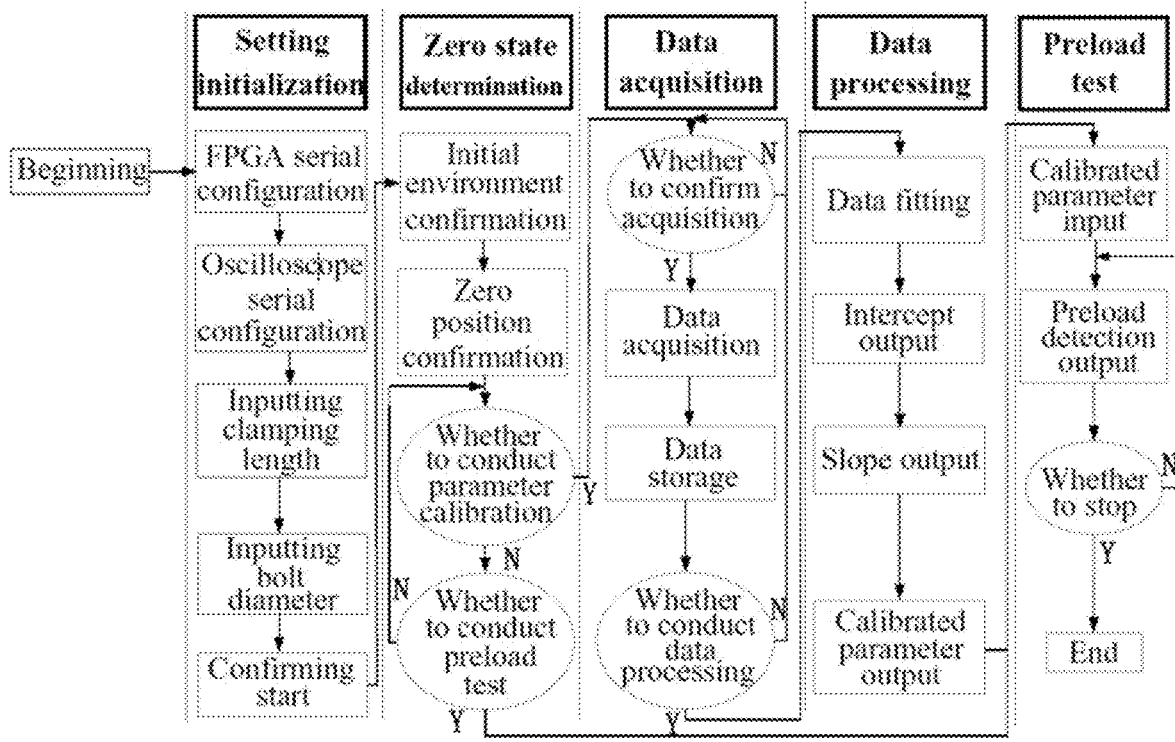
FIG. 2 is a bolt preload detection flow chart.
Figure 3:
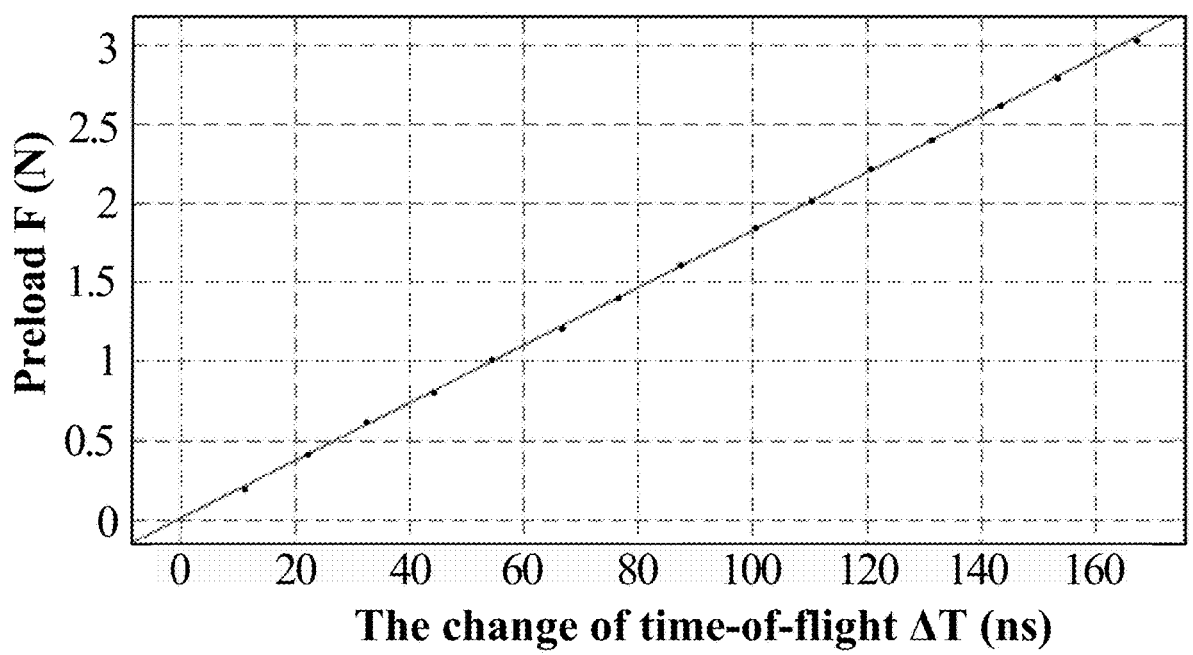
FIG. 3 is a fitting line diagram between the change of time-of-flight and preload.

The present invention is divided into two parts, as shown in FIG. 1 and FIG. 2.

Step 1: Establishing a mathematical relationship of bolt preload.

1) Ensuring that in the process of establishing the relationship, the temperature does not change suddenly or greatly, and the value of the pressure sensor is zero before operation;

2) Pasting a piezoelectric patch 8 with the thickness of 0.4 mm on the center of the head of the M10 bolt, and ensuring that the coverage area of the patch is within the range of the screw rod. Using the patch 8 as an ultrasonic pulser and an ultrasonic receiver by using inverse piezoelectric effect and positive piezoelectric effect.

3) Connecting the piezoelectric patch 8 with the PR5700 ultrasonic pulser/receiver 6, and using the T/R single-transmitting and single-receiving function to simultaneously transmit and receive ultrasonic signals; and then connecting the PR5700 ultrasonic pulser/receiver 6 with the TDS3012 oscilloscope 7 through a BNC wire. The oscilloscope 7 transmits data to PC terminal 1 through GPIB.

4) Placing the K-type thermocouple temperature sensor 5 with a magnetic probe on the pressure sensor. The output signals of the K-type thermocouple temperature sensor 5 and the pressure sensor 10 are amplified by the AD8495 amplifier 4 and acquired by the AD7606 acquisition module 3, the signals acquired by AD are transmitted to the FPGA module 2, and the FPGA module 2 transmits the acquired signals to the PC terminal 1 through serial communication and uses labview for data aggregation and data processing.

5) Aligning the axes of the upper junction plate 9, the pressure sensor 10, the lower junction plate 12 and the bolt 11 pasted with the patch, and exerting a certain preload on the bolt 11 pasted with the patch by a torque wrench to change the pressure signals of the pressure sensor.

6) Under the condition of ensuring that the temperature t does not change suddenly, acquiring the ultrasonic signals, conducting high-pass and low-pass filtering processing on the ultrasonic signals, calculating the ultrasonic phase and the phase difference T from the initial state at this moment, and taking the ultrasonic phase and preload magnitude which are recorded at this moment as a group of corresponding values.

7) Continuously increasing the preload magnitude by a wrench from the looseness state of the bolt. Each preload value corresponds to an ultrasonic phase value. Repeating 5) and 6) until the preload magnitude is increased to the rated preload range of the bolt.

8) Establishing an array of the ultrasonic phase difference acquired previously and the preload, and obtaining the fitting relationship between the ultrasonic phase difference T and the preload F by means of line fitting.

$$F = kT + b$$

where, F is preload, T is ultrasonic phase difference, k is a fitting slope, and b is fitting intercept.

According to the acoustoelasticity theory, adding the ultrasonic temperature coefficient z of the corresponding material, thus obtaining the mathematical expression F=f(T, t) between the preload F and the ultrasonic phase difference T and temperature t.

Step 2: Conducting real-time detection on the bolt preload by using the mathematical relationship expression.

1) Acquiring and calculating the ultrasonic phase in the initial state, i.e. the no-preload state, and acquiring the temperature value and the pressure value in the initial state;

2) Exerting the preload by the wrench, reacquiring the ultrasonic phase at this moment, and calculating the corresponding ultrasonic phase difference;

3) Substituting the acquired temperature value and the calculated ultrasonic phase difference into the obtained mathematical relationship F=f(T,t) between the preload and the ultrasonic phase difference and temperature to calculate the predicted preload magnitude.

The invention claimed is:

1. A piezoelectric patch-based real-time and high-precision bolt preload detection system, characterized in that the piezoelectric patch-based real-time and high-precision bolt preload detection system comprises a PC terminal (1), an FPGA module (2), an acquisition module (3), an amplifier (4), a K-type thermocouple temperature sensor (5), an ultrasonic pulser/receiver (6), an oscilloscope (7), a piezoelectric patch (8), an upper junction plate (9), a pressure sensor (10), a bolt (11) pasted with the patch, and a lower junction plate (12); the pressure sensor (10) is arranged between the upper junction plate (9) and the lower junction plate (12), the bolt is inserted into the upper junction plate (9), the pressure sensor (10) and the lower junction plate (12) in sequence, and the center of the head of the bolt is pasted with the piezoelectric patch (8); the piezoelectric patch (8) is connected with the ultrasonic pulser/receiver (6), the ultrasonic pulser/receiver (6) is connected with the oscilloscope (7), and the oscilloscope (7) transmits data to the PC terminal (1); and the K-type thermocouple temperature sensor (5) is arranged on the pressure sensor (10), output signals of the K-type thermocouple temperature sensor (5) and the pressure sensor (10) are amplified by the amplifier (4) and acquired by the acquisition module (3), the signals acquired by the acquisition module (3) are transmitted to the FPGA module (2), and the FPGA module (2) transmits the acquired signals to the PC terminal (1) through serial communication.

2. A piezoelectric patch-based real-time and high-precision bolt preload detection method, comprising the following steps:
(1) establishing a preload test model based on the change of time-of-flight of single echo:
characterizing the service condition of preload by detecting the change of time-of-flight, i.e. the time difference between the first echo of the first reflection echo and the first echo of the second reflection echo, and theoretically deriving the relation model thereof as follows:

$$F = \frac{V_0}{2(A_L + E^{-1})} \cdot \frac{S_e(1 + \alpha_t \Delta T)}{L_e(1 + \beta \Delta T)} \cdot \Delta t$$

where, F is preload, $V_0$ is initial ultrasonic velocity, $A_L$ is ultrasonic stress coefficient, E is the elastic modulus of material, $S_e$ is the cross-sectional area of the bolt, $L_e$ is the effective tightening length of the bolt, $\alpha_t$ is the temperature-varying coefficient of longitudinal wave velocity, $\beta$ is the expansion coefficient of material, $\Delta T$ is variation of temperature, and $\Delta t$ is the change of time-of-flight of single echo;
it is seen from the above formula that the preload magnitude has an approximately linear relationship with the change of time-of-flight and the preload is detected by means of line fitting, i.e. without measuring properties of the material;
(2) fitting the relationship between the change of time-of-flight of single echo and the bolt preload:
1) ensuring that in the process of establishing the relationship, the temperature does not change, and the value of the pressure sensor is zero before operation;
2) pasting the corresponding piezoelectric patch (8) on the center of the head of the bolt as the pulser and the receiver;
3) connecting the piezoelectric patch (8) with the ultrasonic pulser/receiver (6), and using the single-transmitting and single-receiving function to simultaneously transmit and receive ultrasonic signals; and then connecting the ultrasonic pulser/receiver (6) with the oscilloscope (7) which transmits data to the PC terminal (1);
4) placing the K-type thermocouple temperature sensor (5) with a magnetic probe on the pressure sensor (10), the output signals of the K-type thermocouple temperature sensor (5) and the pressure sensor (10) are amplified by the amplifier (4) and acquired by the acquisition module (3), the signals acquired by the acquisition module (3) are transmitted to the FPGA module (2), and the FPGA module (2) transmits the acquired signals to the PC terminal (1) through serial communication;
5) exerting a certain preload on the bolt to change the pressure signals of the pressure sensor (10);
6) under the condition of ensuring that the temperature is constant, acquiring the ultrasonic signals, conducting high-pass and low-pass filtering processing on the ultrasonic signals, calculating the ultrasonic phase and the phase difference from the initial state at this moment, and taking the ultrasonic phase and preload magnitude which are recorded at this moment as a group of corresponding values;
7) continuously increasing the preload magnitude from the looseness state of the bolt; each preload value corresponds to an ultrasonic phase value; repeating 5) and 6) until the preload magnitude is increased to the rated preload range of the bolt;
8) establishing an array of the acquired ultrasonic phase difference and the preload, and obtaining the fitting relationship between the ultrasonic phase difference T and the preload F by means of line fitting; and then adding the ultrasonic temperature coefficient of the corresponding material, thus obtaining the mathematical expression F=f(T,t) between the preload F and the ultrasonic phase difference T and temperature t;
(3) conducting real-time detection on the bolt preload by using the mathematical relationship expression;
1) acquiring and calculating the ultrasonic phase in the initial state, i.e. the no-preload state, and acquiring the temperature value and the pressure value in the initial state;
2) exerting the preload, reacquiring the ultrasonic phase at this moment, and calculating the corresponding ultrasonic phase difference;
3) substituting the acquired temperature value and the calculated ultrasonic phase difference into the obtained mathematical relationship expression F=f(T,t) between the preload and the ultrasonic phase difference and temperature to calculate the predicted preload magnitude.

* * * * *